(12) United States Patent
Wen et al.

(10) Patent No.: US 11,205,384 B2
(45) Date of Patent: Dec. 21, 2021

(54) DISPLAY SCREEN CONTROL METHOD AND TERMINAL

(71) Applicant: Huawei Technologies Co., Ltd., Shenzhen (CN)

(72) Inventors: Yung Chi Wen, Shenzhen (CN); Gang Xu, Shenzhen (CN); Kaiyuan Ko, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/603,491

(22) PCT Filed: Jul. 31, 2017

(86) PCT No.: PCT/CN2017/095192
§ 371 (c)(1),
(2) Date: Oct. 7, 2019

(87) PCT Pub. No.: WO2018/184325
PCT Pub. Date: Oct. 11, 2018

(65) Prior Publication Data
US 2020/0234645 A1    Jul. 23, 2020

(30) Foreign Application Priority Data
Apr. 6, 2017 (CN) .......................... 201710222055.0

(51) Int. Cl.
*G09G 3/3258* (2016.01)
*G09G 3/20* (2006.01)
(Continued)

(52) U.S. Cl.
CPC ......... *G09G 3/3258* (2013.01); *G09G 3/2003* (2013.01); *G09G 3/2074* (2013.01);
(Continued)

(58) Field of Classification Search
CPC ......... G09G 2300/0452; G09G 3/2003; G09G 3/342; G09G 3/3406; G09G 3/3208;
(Continued)

(56) References Cited

U.S. PATENT DOCUMENTS 6,429,840 B1    8/2002 Sekiguchi
10,269,285 B2 *  4/2019 Lee ....................... G09G 3/2044
(Continued)

FOREIGN PATENT DOCUMENTS

CN    1322339 A    11/2001
CN    1497517 A    5/2004
(Continued)

OTHER PUBLICATIONS

Machine Translation and Abstract of Chinese Publication No. CN102446490, May 9, 2012, 18 pages.
(Continued)

*Primary Examiner* — Dismery Mercedes
(74) *Attorney, Agent, or Firm* — Conley Rose, P.C.

(57) ABSTRACT

A display screen control method and a terminal for monitoring whether a terminal satisfies a low-power running condition, where a display screen of the terminal is an organic light emitting display screen, and each pixel unit of the organic light emitting display screen includes at least one red subpixel, at least one blue subpixel, and at least one green subpixel, and decreasing a frequency of any one or two of a drive signal of the red subpixel, a drive signal of the green subpixel, and a drive signal of the blue subpixel when it is detected that the terminal satisfies the low-power running condition.

20 Claims, 4 Drawing Sheets

(51) Int. Cl.
*G09G 3/3233* (2016.01)
*G09G 3/3208* (2016.01)

(52) U.S. Cl.
CPC ......... *G09G 3/3208* (2013.01); *G09G 3/3233* (2013.01); *G09G 2320/064* (2013.01); *G09G 2330/021* (2013.01); *G09G 2330/028* (2013.01)

(58) Field of Classification Search
CPC .. G09G 3/3607; G09G 3/3648; G09G 3/2074; G09G 2320/0673; G09G 2340/06; G09G 5/10; G09G 3/3233; G09G 3/3696; G09G 3/3258; G09G 3/20; G09G 2330/021; G09G 2330/045; G09G 5/02; G09G 2320/0276; G09G 2320/0666; G09G 2340/0457; G09G 2330/023; H01L 27/3216; H01L 27/3211
See application file for complete search history.

(56) References Cited

U.S. PATENT DOCUMENTS

| | | | |
|---|---|---|---|
| 10,431,177 B2* | 10/2019 | Nakanishi | G09G 3/3607 |
| 2004/0080500 A1 | 4/2004 | Koyama | |
| 2004/0222951 A1* | 11/2004 | Lee | G09G 3/3208 345/77 |
| 2005/0041006 A1 | 2/2005 | Lee et al. | |
| 2006/0022929 A1 | 2/2006 | Hashimoto et al. | |
| 2006/0256045 A1* | 11/2006 | Jeon | G09G 3/22 345/74.1 |
| 2008/0212884 A1* | 9/2008 | Oneda | H04N 19/132 382/232 |
| 2014/0043315 A1 | 2/2014 | Yamazaki et al. | |
| 2014/0198016 A1* | 7/2014 | Hunt | G09G 3/36 345/5 |
| 2014/0267448 A1* | 9/2014 | Albrecht | G09G 3/2007 345/690 |
| 2014/0340431 A1* | 11/2014 | Yamakawa | G09G 3/3426 345/690 |
| 2015/0170607 A1* | 6/2015 | Shin | G09G 3/3406 345/690 |
| 2015/0187304 A1 | 7/2015 | Ko et al. | |
| 2015/0213768 A1 | 7/2015 | Jung | |
| 2015/0228048 A1* | 8/2015 | Heo | G06F 1/3265 345/502 |
| 2015/0228216 A1* | 8/2015 | Lee | G09G 3/20 345/691 |
| 2016/0124491 A1* | 5/2016 | An | G09G 3/3233 713/323 |
| 2016/0189670 A1 | 6/2016 | Kim et al. | |
| 2016/0379538 A1* | 12/2016 | Yan | G09G 5/006 345/698 |
| 2017/0256191 A1 | 9/2017 | Wen et al. | |
| 2018/0211579 A1* | 7/2018 | Bae | G09G 3/2003 |
| 2018/0286306 A1* | 10/2018 | Chauhan | G09G 3/3406 |

FOREIGN PATENT DOCUMENTS

| | | |
|---|---|---|
| CN | 1728230 A | 2/2006 |
| CN | 102446490 A | 5/2012 |
| CN | 103185996 A | 7/2013 |
| CN | 103226934 A | 7/2013 |
| CN | 103439824 A | 12/2013 |
| CN | 104103232 A | 10/2014 |
| CN | 104134415 A | 11/2014 |
| CN | 104751813 A | 7/2015 |
| CN | 105185311 A | 12/2015 |
| CN | 106128350 A | 11/2016 |
| CN | 106531096 A | 3/2017 |
| JP | 2001265295 A | 9/2001 |
| JP | 2001282209 A | 10/2001 |
| TW | I304963 B | 1/2009 |

OTHER PUBLICATIONS

Machine Translation and Abstract of Chinese Publication No. CN103185996, Jul. 3, 2013, 18 pages.
Machine Translation and Abstract of Chinese Publication No. CN104103232, Oct. 15, 2014, 12 pages.
Machine Translation and Abstract of Japanese Publication No. JP2001265295, Sep. 28, 2001, 25 pages.
Foreign Communication From A Counterpart Application, PCT Application No. PCT/CN2017/095192, English Translation of International Search Report dated Jan. 5, 2018, 2 pages.
Foreign Communication From A Counterpart Application, PCT Application No. PCT/CN2017/095192, English Translation of Written Opinion dated Jan. 5, 2018, 3 pages.

* cited by examiner

DISPLAY SCREEN CONTROL METHOD AND TERMINAL

CROSS-REFERENCE TO RELATED APPLICATIONS

This application is a U.S. National Stage of International Patent Application No. PCT/CN2017/095192 filed on Jul. 31, 2017, which claims priority to Chinese Patent Application No. 201710222055.0 filed on Apr. 6, 2017. Both of the aforementioned applications are hereby incorporated by reference in their entireties.

TECHNICAL FIELD

This application relates to the control field, and in particular, to a display screen control method and a terminal.

BACKGROUND

An active-matrix organic light emitting diode (active-matrix organic light emitting diode, AMOLED) is a commonly used component of a display screen of a terminal. The AMOLED forms a subpixel of the display screen. For example, a red AMOLED is a red subpixel, a green AMOLED is a green subpixel, and a blue AMOLED is a blue subpixel. Light emitted by a pixel on the display screen is synthesized by light (that is, red light, green light, and blue light) emitted after the red subpixel, the green subpixel, and the blue subpixel are lit. To decrease power consumption and increase a battery life of the terminal, currently, most terminals turn off some AMOLEDs in a standby mode. In other words, the terminals light only some subpixels.

However, research shows that even if only the some subpixels are lit in the standby mode, a display drive chip used to drive the subpixels to be lit is still a largest source of power consumption of the terminals.

Therefore, how to decrease power consumption of the display drive chip becomes a problem that urgently needs to be resolved currently.

SUMMARY

This application provides a display screen control method and a terminal, and an objective is to resolve a problem of how to decrease power consumption of a display drive chip.

To achieve the foregoing objective, this application provides the following technical solutions:

A first aspect of this application provides a display screen control method, including: monitoring whether a terminal satisfies a low-power running condition, where a display screen of the terminal is an organic light emitting display screen, and each pixel unit of the organic light emitting display screen includes at least one red subpixel, at least one blue subpixel, and at least one green subpixel; and decreasing a frequency of any one or two of a drive signal of the red subpixel, a drive signal of the green subpixel, and a drive signal of the blue subpixel when it is detected that the terminal satisfies the low-power running condition. Decreasing the frequency of any one or two of the drive signals can decrease a function of a display drive chip. Therefore, power consumption can be reduced.

A second aspect of this application provides a terminal, including a display screen, one or more processors, and a display drive chip. The display screen is an organic light emitting display screen, and each pixel unit of the organic light emitting display screen includes at least one red subpixel, at least one blue subpixel, and at least one green subpixel. The display drive chip is configured to drive, by using drive signals, the at least one red subpixel, the at least one blue subpixel, and the at least one green subpixel to be lit. The processor is configured to monitor whether the terminal satisfies a low-power running condition, and send a control instruction to the display drive chip when it is detected that the terminal satisfies the low-power running condition, where the control instruction is used to instruct to decrease a frequency of any one or two of a drive signal of the red subpixel, a drive signal of the green subpixel, and a drive signal of the blue subpixel. The terminal can reduce power consumption by decreasing a frequency of a drive signal.

In an implementation, the decreasing a frequency of any one or two of a drive signal of the red subpixel, a drive signal of the green subpixel, and a drive signal of the blue subpixel includes: decreasing the frequency of any one or two of the drive signal of the red subpixel, the drive signal of the green subpixel, and the drive signal of the blue subpixel to a first value. Further, the method further includes: decreasing a frequency of another drive signal other than a drive signal whose frequency is decreased to the first value to a second value, where the second value is greater than the first value. Frequencies of some drive signals are decreased to the first value, and frequencies of other drive signals are decreased to the second value greater than the first value. This helps ensure normal display of the display screen to a largest extent while reducing power consumption.

In an implementation, the first value is 1 Hz, and the second value is 15 Hz.

In an implementation, the low-power running condition includes at least one of the following: an electricity quantity of the terminal is less than a preset value; the terminal is currently in a low power mode; and the terminal receives a preset instruction.

A third aspect of this application provides a display screen control method, including: monitoring whether a terminal satisfies a low-power running condition, where a display screen of the terminal is an organic light emitting display screen, and each pixel unit of the organic light emitting display screen includes at least one red subpixel, at least one blue subpixel, and at least one green subpixel; and turning off any one or two of a drive signal of the red subpixel, a drive signal of the green subpixel, and a drive signal of the blue subpixel when it is detected that the terminal satisfies the low-power running condition. Turning off some drive signals can reduce power consumption.

A fourth aspect of this application provides a terminal, including a display screen, one or more processors, and a display drive chip. The display screen is an organic light emitting display screen, and each pixel unit of the organic light emitting display screen includes at least one red subpixel, at least one blue subpixel, and at least one green subpixel. The display drive chip is configured to drive, by using drive signals, the at least one red subpixel, the at least one blue subpixel, and the at least one green subpixel to be lit. The processor is configured to monitor whether the terminal satisfies a low-power running condition, and send a control instruction to the display drive chip when it is detected that the terminal satisfies the low-power running condition, where the control instruction is used to instruct to turn off any one or two of a drive signal of the red subpixel, a drive signal of the green subpixel, and a drive signal of the blue subpixel. The terminal can reduce power consumption by turning off some drive signals.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

Figure 1:
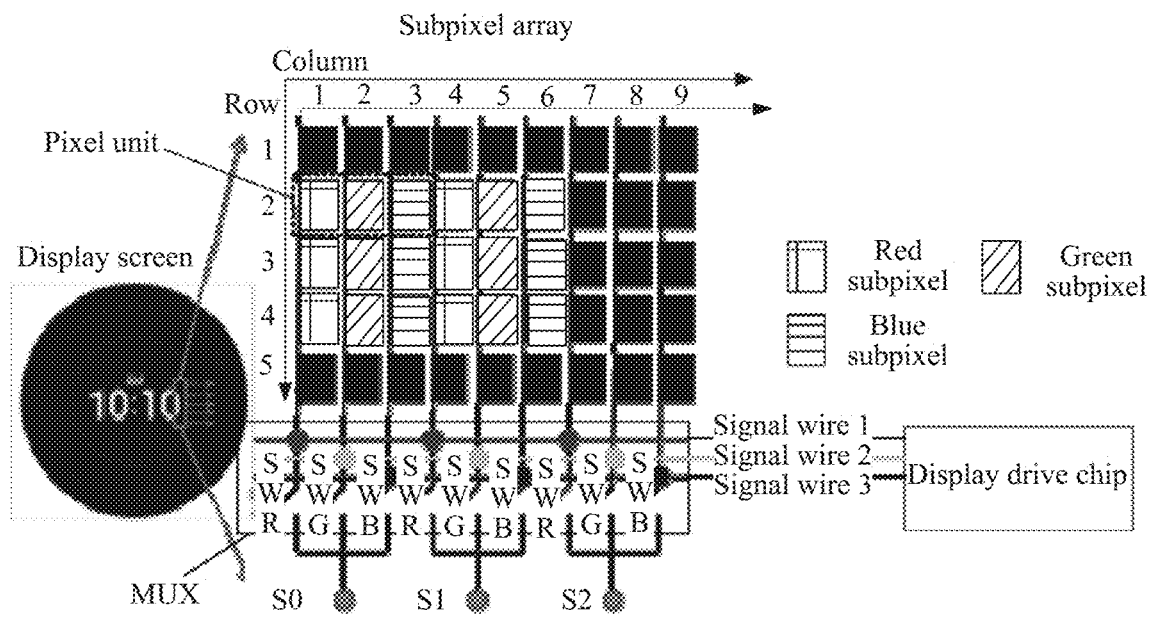
FIG. 1 is a schematic structural diagram of a display circuit in a terminal.

FIG. 1 is a schematic structural diagram of a display circuit in a terminal. In FIG. 1, a correspondence between a pixel on a display screen shown on a left side and a subpixel array shown on a right side is: light emitted by each pixel on the display screen is synthesized by light emitted by at least one red subpixel, at least one green subpixel, and at least one blue subpixel. Subpixels corresponding to all pixels form the subpixel array shown on the right side in FIG. 1. Based on the foregoing correspondence, any pixel on the display screen is referred to as a pixel unit. Each pixel unit includes the at least one red subpixel, the at least one green subpixel, and the at least one blue subpixel (a part in a dashed-line box in FIG. 1) in the subpixel array.

Any column of the subpixel array includes subpixels in a same color. As shown in FIG. 1, subpixels in a first column of the subpixel array are all red subpixels, subpixels in a second column are all green subpixels, and subpixels in a third column are all blue subpixels. An arrangement manner of a fourth column to a sixth column and an arrangement manner of a seventh column to a ninth column are both the same as an arrangement manner of the first column to the third column. Based on the foregoing arrangement manner, in any row of the subpixel array, every three subpixels form one pixel unit on the display screen on the left side. White light emitted by a pixel is synthesized by red light emitted by a red subpixel, green light emitted by a green subpixel, and blue light emitted by a blue subpixel.

In FIG. 1, S0, S1, and S2 are all signal sources. Each signal source is switchably connected to a column of red subpixels, a column of green subpixels, and a column of blue subpixels by using a multiplexer (multiplexer, MUX). A display drive chip is connected to the red subpixels, the green subpixels, and the blue subpixels by using signal wires. Specifically, the display drive chip is connected to all red subpixels in the subpixel array by using a signal wire 1, is connected to all green subpixels in the subpixel array by using a signal wire 2, and is connected to all blue subpixels in the subpixel array by using a signal wire 3. A dot on each signal wire indicates that signal wires intersecting at the dot are in communication.

The MUX receives drive signals (represented by SWR) of the red subpixels from the display drive chip by using the signal wire 1, receives drive signals (represented by SWG) of the green subpixels from the display drive chip by using the signal wire 2, and receives drive signals (represented by SWB) of the blue subpixels from the display drive chip by using the signal wire 3. When a received drive signal of subpixels in a color is valid (at a high level), the MUX turns on a switch between the subpixels in the color and a signal source.

FIG. 1 shows a display status of an existing display screen in a low power mode. In the low power mode, in the subpixel array, only some subpixels in the second, the third, and the fourth rows are lit (where the lit subpixels are represented by using white blocks, and different patterns in the white blocks are used to distinguish different colors), and other subpixels are all unlit (where the unlit subpixels are represented by using black blocks). Corresponding to the display screen, only pixels displaying time on the display screen are lit (white parts), and other pixels are unlit (black parts).

Figure 2:
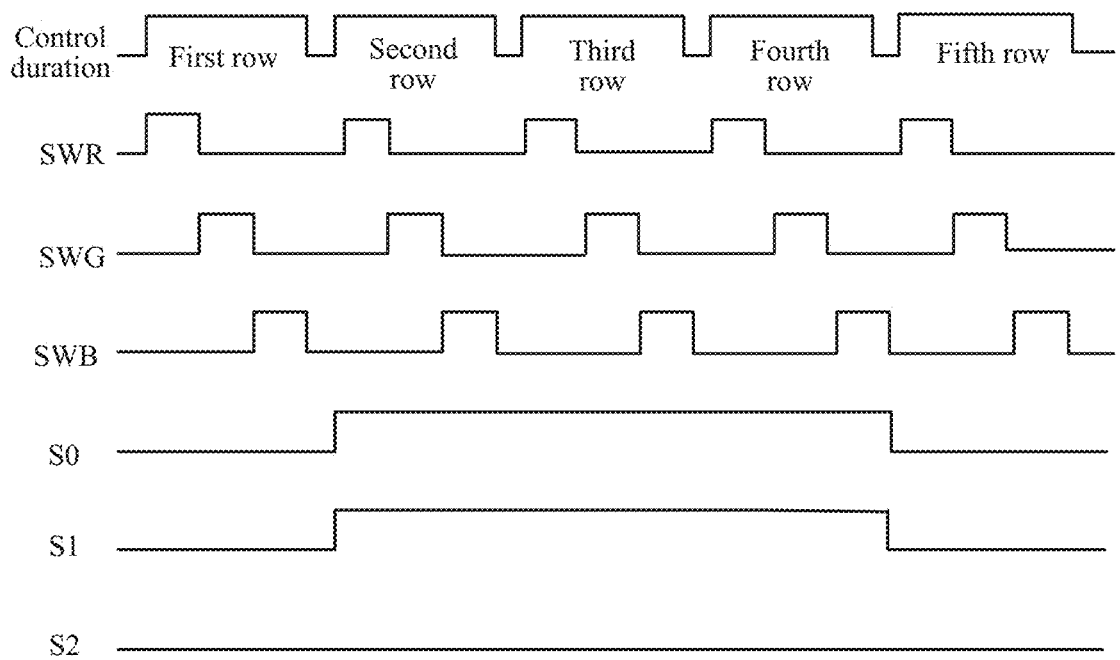
FIG. 2 is a schematic waveform diagram of driving the display circuit shown in FIG. 1 to emit light.

FIG. 2 is a waveform diagram of a control signal forming a scenario in which some subpixels in the subpixel array shown in FIG. 1 are lit. In FIG. 2, a waveform in a first row is a control duration waveform. High levels successively indicate control periods of a first row of subpixels, a second row of subpixels, . . . , and a fifth row of subpixels in the subpixel array in FIG. 1.

SWR is a drive signal of the red subpixel in the subpixel array in FIG. 1, and a high level indicates that the drive signal is valid. SWG is a drive signal of the green subpixel in the subpixel array in FIG. 1, and a high level indicates that the drive signal is valid. SWB is a drive signal of the blue subpixel in the subpixel array in FIG. 1, and a high level indicates that the drive signal is valid.

S0, S1, and S2 are all signal sources. A high level indicates validity.

In a control period of the first row of subpixels, high levels successively occur in the drive signals SWR, SWG, and SWB. Therefore, the MUX successively communicates red subpixels, green subpixels, and blue subpixels with the signal sources. However, S0, S1, and S2 are all at low levels. Therefore, the first row of subpixels are all unlit.

In a control period of the second row of subpixels, high levels successively occur in the drive signals SWR, SWG, and SWB. When SWR is at the high level, the MUX respectively communicates red subpixels with corresponding signal sources. In the control period of the second row of subpixels, S0 and S1 are at high levels, and S2 is all at a low level. Therefore, red subpixels under control of S0 and S1 are lit, and red subpixels under control of S2 are unlit. A principle that green subpixels are lit and a principle that blue subpixels are lit are the same as a principle that the red subpixels are lit.

A lighting principle of a third row of subpixels and a lighting principle of a fourth row of subpixels are the same as that of the second row of subpixels, and a lighting principle of the fifth row of subpixels is the same as that of the first row of subpixels. Details are not described herein again.

It can be learned from FIG. 1 and FIG. 2 that, for a subpixel area not to be lit in the subpixel array, a signal source in the area only needs to be invalidated. For a subpixel area to be lit in the subpixel array, in addition to validating a signal source in the area, the subpixel further needs to be driven, in cooperation with a drive signal, to be lit.

Which areas of subpixels are to be lit is beyond a discussion scope of this application.

An objective of a display screen control method provided in an embodiment of this application is to decrease power consumption of a display drive chip by decreasing a frequency of any one or two of SWR, SWG, and SWB.

The terminal applicable to the scenario shown in FIG. 1 includes a light emitting display screen. The light emitting display screen includes, but is not limited to, an AMOLED display screen and an organic light emitting diode (organic light emitting diode, OLED) display screen. Specifically, the terminal may be a handheld device, an in-vehicle device, a wearable device, a computing device, and user equipments (user equipment, UE) in various forms, a mobile station (mobile station, MS), and the like. For example, the terminal in this application may be a smartwatch.

A correspondence between a pixel on the light emitting display screen and a subpixel array may be shown in FIG. 1. However, FIG. 1 is only an example. Subpixels in the subpixel array may alternatively be arranged in another manner, for example, an RGB PenTile manner.

Figure 3:
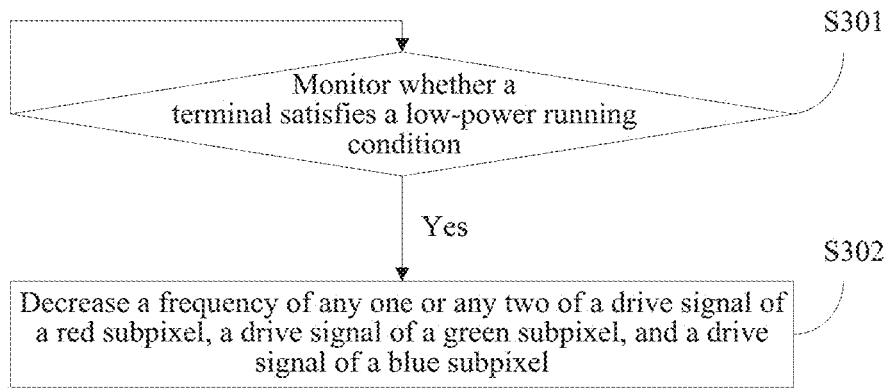
FIG. 3 is a flowchart of a display screen control method according to an embodiment of the present invention.

FIG. 3 shows a display screen control method according to an embodiment of this application. The method includes the following steps.

S301: Monitor whether a terminal satisfies a low-power running condition, and if yes, perform S302, or if no, continue to perform S301. Optionally, S301 may be performed in a preset period.

Specifically, the low-power running condition may include at least one of the following: an electricity quantity of the terminal is less than a preset value, the terminal is currently in a low power mode, and the terminal receives a preset instruction (for example, an instruction sent after a user selects an "ultra power saving" option on the terminal).

The low power mode is a mode that is started for decreasing consumption of the terminal to save power. In the low power mode, the terminal may save power by closing some applications, some hardware, some processes, and the like. For example, the terminal starts a standby mode. In the standby mode, the terminal closes some processes running in a background.

S302: Decrease a frequency of any one or two of SWR, SWG, and SWB.

Power $P=fcv^2$, where f indicates a drive frequency, v indicates an amplitude value of a control signal, and c indicates load. It can be learned from the foregoing formula that, when f is decreased, power is also decreased. Therefore, use of a method of decreasing a frequency of a control signal of a subpixel can decrease power consumption of a display drive chip, thereby decreasing power consumption of the terminal, and increasing a battery life of the terminal.

Figure 4:
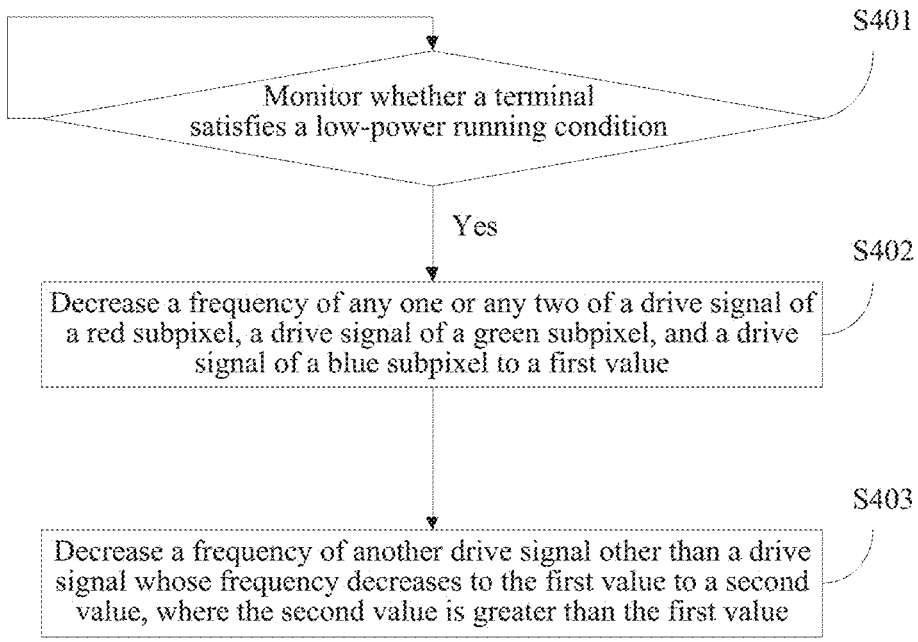
FIG. 4 is a flowchart of another display screen control method according to an embodiment of the present invention.

FIG. 4 is another display screen control method according to an embodiment of this application. A difference from the method shown in FIG. 3 lies in that, to further decrease power consumption, frequencies of drive signals of three channels for subpixels are all decreased.

Specifically, FIG. 4 includes the following steps.

S401: Monitor whether a terminal satisfies a low-power running condition, and if yes, perform S402.

S402: Decrease a frequency of any one or two of SWR, SWG, and SWB to a first value.

S403: Decrease a frequency of another drive signal other than a drive signal whose frequency is decreased to the first value to a second value, where the second value is greater than the first value.

For example, in S402, frequencies of SWG and SWB are decreased to 1 Hz, and in S403, a frequency of SWR is decreased to 15 Hz.

An order of S402 and S403 may be changed.

The following describes procedures shown in FIG. 3 and FIG. 4 by using FIG. 5 as an example.

In a normal working state of the terminal, frequencies of SWR, SWG, and SWB are all 60 Hz. The display drive chip monitors whether the terminal enters the low power mode. If the display drive chip detects that the terminal enters the low power mode, a frequency of SWG is decreased to 15 Hz, and frequencies of SWR and SWB are decreased to 1 Hz.

Alternatively, the terminal is already in the low power mode. To be specific, the frequencies of SWR, SWG, and SWB are all decreased from 60 Hz to 15 Hz. In this case, if an instruction on entering an "ultra power saving" mode that is entered by the user is detected, the frequencies of SWG and SWB are both decreased from 15 Hz to 1 Hz, and the frequency of SWR maintains 15 Hz.

Figure 5A:
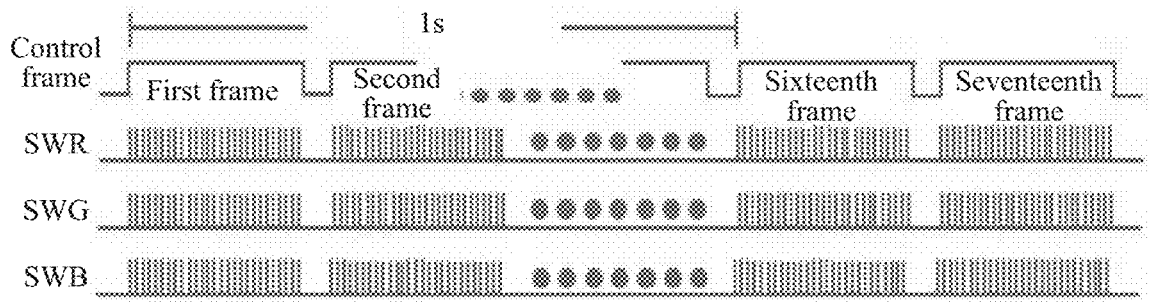
FIG. 5(a) is a schematic waveform diagram controlled by a display screen in the prior art.
Figure 5B:
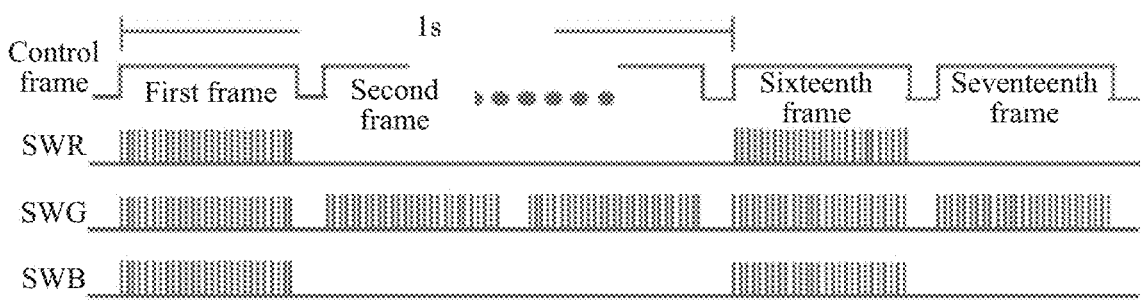
FIG. 5(b) is a schematic waveform diagram of a display screen control method according to an embodiment of the present invention.

FIG. 5(a) is a waveform diagram when the frequencies of SWR, SWG, and SWB are all 15 Hz in an existing low power mode shown in FIG. 1. FIG. 5(b) is a waveform diagram when the frequencies of SWR and SWB are 1 Hz and the frequency of SWG is 15 Hz after the method shown in FIG. 4 is used. Vertical bars on SWR, SWG, and SWB in FIG. 5(a) and FIG. 5(b) indicate drive signals sent in parallel of a plurality of rows (for example, 1092 rows) of subpixels in a frame. SWR is used as an example. Any vertical bar indicates SWR sent of a row of subpixels of a subpixel array.

Based on a control principle, shown in FIG. 1, that the display screen is lit, because the frequencies of SWR and SWB are 1 Hz and the frequency of SWG is 15 Hz, when a signal source (S0, S1, or S2) is at a high level, the red subpixels, the green subpixels, and the blue subpixels are all lit. Therefore, theoretically, a pixel lit on the display screen is displayed in white.

However, the drive frequencies of SWR and SWB are 1 Hz that is less than 15 Hz. Therefore, it is equivalent to a longer time interval between two time points at which the red subpixels and the blue subpixels are lit. Therefore, for a display screen of not good quality, pixels displayed on the display screen may be visually displayed in green.

Likewise, the frequencies of SWG and SWB may be decreased to 1 Hz, and the frequency of SWR to 15 Hz. Alternatively, the frequency of SWR may be decreased to 1 Hz, and the frequencies of SWG and SWB to 15 Hz.

Human eyes are more sensitive to green light. Therefore, when the frequencies of the three types of drive signals SWR, SWG, and SWB are decreased, preferably, the frequency of SWG is 15 Hz, the frequencies of SWR and SWB are 1 Hz, to fully use sensitivity of the human eyes to the green light, so that the user does not feel that content displayed on a display screen is excessively dark.

1 Hz is only an example. This embodiment of this application does not limit a decreased frequency. Optionally, the decreased frequency is less than 15 Hz. 15 Hz is also only an example.

Certainly, a lower decreased frequency indicates lower power consumption of the display drive chip. However, a possibility that a pixel displayed on the display screen cannot be displayed in white is higher. During actual application, the first value and the second value may be adjusted based on an actual requirement.

It can be learned from FIG. 5 that when the frequencies of SWR, SWG, and SWB are different, and the frequencies of SWR and SWB are both lower than the frequency of SWG, normal display of the display screen can still be maintained. It can be teamed that the screen display control method shown in this embodiment can decrease power consumption of a display driver while maintaining the normal display of the display screen.

Figure 6:
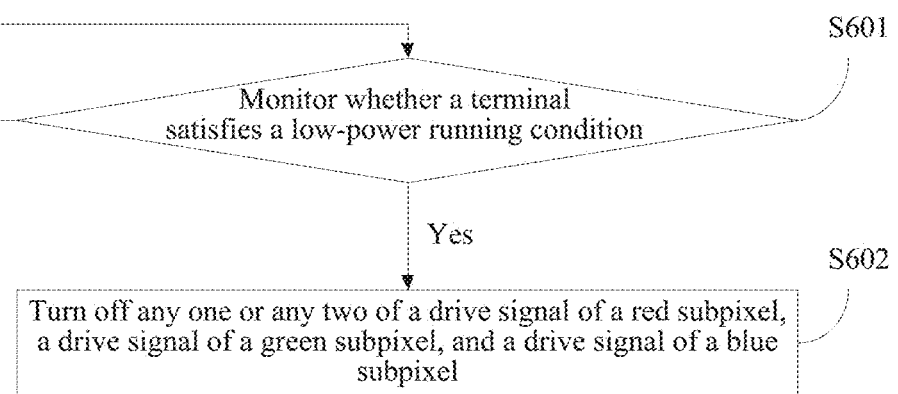
FIG. 6 is a flowchart of another display screen control method according to an embodiment of the present invention.

FIG. 6 shows another display screen control method according to an embodiment of this application. The method includes the following steps.

S601: Monitor whether a terminal satisfies a low-power running condition, and if yes, perform S602.

S602: Turn off any one or two of SWR, SWG, and SWB.

Optionally, after some drive signals are turned off, a frequency of a drive signal that is not turned off may further be decreased.

Compared with the foregoing embodiments, in the embodiment shown in FIG. 6, a drive signal is directly turned off, to decrease power consumption of a display driver. After the some drive signals are turned off, subpixels of only some colors are lit, and a color of light emitted by the display screen is a color of a subpixel of the drive signal that is not turned off. For example, SWR and SWB are turned off, and only green subpixels are lit. Therefore, content displayed on the display screen is green. Further, preferably, SWG may be retained, so that a user does not feel that the content displayed on the display screen is excessively dark.

Figure 7:
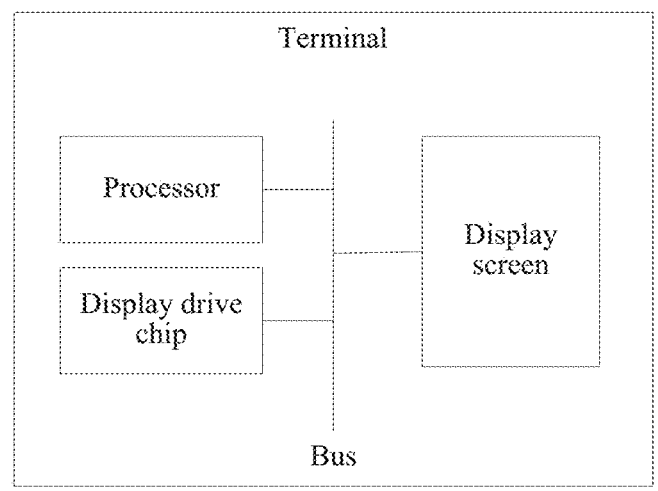
FIG. 7 is a schematic structural diagram of a terminal according to an embodiment of the present invention.

FIG. 7 shows a terminal according to an embodiment of this application. The terminal includes a display screen, one or more processors, and a display drive chip.

The display screen is an organic light emitting display screen. As shown in FIG. 1, each pixel unit of the organic light emitting display screen includes at least one red subpixel, at least one blue subpixel, and at least one green subpixel.

The display drive chip is configured to drive, by using drive signals, the at least one red subpixel, the at least one blue subpixel, and the at least one green subpixel to be lit. For a connection relationship between the display drive chip and the display screen, refer to FIG. 1.

The processor is configured to monitor whether the terminal satisfies a low-power running condition, and send a control instruction to the display drive chip when it is detected that the terminal satisfies the low-power running condition, where the control instruction is used to instruct to decrease a frequency of any one or two of a drive signal of the red subpixel, a drive signal of the green subpixel, and a drive signal of the blue subpixel.

In addition to the foregoing functions, the processor may further be configured to monitor whether the terminal satisfies a low-power running condition, and send a control instruction to the display drive chip when it is detected that the terminal satisfies the low-power running condition, where the control instruction is used to instruct to turn off any one or two of a drive signal of the red subpixel, a drive signal of the green subpixel, and a drive signal of the blue subpixel.

For a specific process of implementing the foregoing functions by the processor, refer to FIG. 3, FIG. 4, or FIG. 6. Details are not described herein again.

The processor for implementing the foregoing functions may be a central processing unit of the terminal, a processor dedicated for controlling the display screen, a processor integrated into the display drive chip, or a separately disposed processor other than the foregoing processors.

The processor may be a general purpose processor, a digital signal processor (DSP), an application-specific integrated circuit (ASIC), a field programmable gate array (FPGA), another programmable logic device, a transistor logic device, a hardware component, or any combination thereof. The processor may implement or execute various examples of logical blocks, modules, and circuits described with reference to content disclosed in this application. Alternatively, the processor may be a combination of processors implementing a computing function, for example, a combination of one or more microprocessors, or a combination of the DSP and a microprocessor.

The functions of the processor may be implemented in a hardware manner, or may be implemented in a manner of executing a software instruction by the processor. The software instruction may be formed by a corresponding software module. The software module may be stored in a RAM memory, a flash memory, a ROM memory, an EPROM memory, an EEPROM memory, a register, a hard disk, a removable hard disk, a CD-ROM, or a storage medium in any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the terminal. Certainly, the processor and the storage medium may exist in the terminal as discrete components.

Parts included in the terminal may communicate by using a bus.

The terminal shown in FIG. 7 can achieve, by turning off a drive signal of subpixels or decreasing a frequency of a drive signal of subpixels, an objective of reducing power consumption.

A person skilled in the art should be aware that in the foregoing one or more examples, functions described in this application may be implemented by hardware, software, firmware, or any combination thereof. A person skilled in the art should easily be aware that, in combination with the examples of units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application. When this application is implemented by software, the functions may be stored in a non-transitory computer-readable medium or transmitted as one or more instructions or code in the non-transitory computer-readable medium. The non-transitory computer-readable medium includes a non-transitory computer storage medium and a communications medium, where the communications medium includes any medium that enables a computer program to be transmitted from one place to another. The non-transitory storage medium may be any available non-transitory storage medium accessible to a general-purpose or dedicated computer.

What is claimed is:

1. A display screen control method, comprising:
monitoring whether a terminal satisfies a low-power running condition;
detecting that the terminal satisfies the low-power running condition, wherein detecting that the terminal satisfies the low-power running condition comprises detecting that a battery level of the terminal is less than a preset value;
in a pixel unit of an organic light-emitting diode (OLED) display screen of the terminal, wherein the pixel unit comprises one red subpixel, one green subpixel, and one blue subpixel, decreasing a frequency of a drive signal of the red subpixel of the pixel unit, a drive signal of the green subpixel of the pixel unit, or a drive signal of the blue subpixel of the pixel unit to a selected first value when the terminal satisfies the low-power running condition; and
decreasing a frequency of another drive signal other than a drive signal whose frequency is decreased to the first value to a second value, wherein the second value is greater than the first value.

2. The display screen control method of claim 1, further comprising decreasing a frequency of two of: the drive signal of the red subpixel, the drive signal of the green subpixel, or the drive signal of the blue subpixel, when the terminal satisfies the low-power running condition.

3. The display screen control method of claim 1, wherein detecting that the terminal satisfies the low-power running condition comprises detecting that the terminal is in a low power mode.

4. The display screen control method of claim 1, wherein detecting that the terminal satisfies the low-power running condition further comprises the terminal receiving a preset instruction.

5. The display screen control method of claim 1, wherein the OLED display screen is an active-matrix OLED (AMOLED) display screen.

6. The display screen control method of claim 1, wherein the first value is 1 hertz (Hz), and wherein the second value is 15 Hz.

7. A terminal, comprising:
a display screen, wherein the display screen comprises an organic light-emitting diode (OLED) display screen, and wherein a pixel unit of the organic light emitting display screen comprises a red subpixel, a blue subpixel, and a green subpixel;
a display drive chip coupled to the display screen and configured to drive, using drive signals, the red subpixel, the blue subpixel, and the green subpixel to be lit; and
a processor coupled to the display screen and the display drive chip and configured to:
monitor whether the terminal satisfies a low-power running condition, wherein satisfying the low-power running condition comprises a battery level of the terminal having less than a preset value; and
in response to the low-power running condition, send a control instruction to the display drive chip when the terminal satisfies the low-power running condition, wherein the control instruction instructs the display drive chip to decrease a frequency of a drive signal of the red subpixel, a drive signal of the green subpixel, or a drive signal of the blue subpixel to a first value, wherein the control instruction is further configured to instruct the display drive chip to decrease a frequency of another drive signal, other than a drive signal whose frequency is decreased to the first value, to a second value, and wherein the second value is greater than the first value.

8. The terminal of claim 7, wherein the processor is further configured to send a control instruction to decrease a frequency of two of the drive signal of the red subpixel, the drive signal of the green subpixel, or the drive signal of the blue subpixel, when the terminal satisfies the low-power running condition.

9. The terminal of claim 7, wherein the low-power running condition comprises that the terminal is currently in a low power mode.

10. The terminal of claim 7, wherein the low-power running condition comprises that the terminal receives a preset instruction.

11. The terminal of claim of 7, wherein the display screen of the terminal is an active-matrix organic light emitting diode (AMOLED) display screen.

12. The terminal of claim 7, wherein the processor is further configured to send a control instruction to decrease a frequency of two of the drive signal of the red subpixel, the drive signal of the green subpixel, or the drive signal of the blue subpixel when the terminal satisfies the low-power running condition, each of the decreased drive signals having a first value.

13. The terminal of claim 7, wherein the first value is 1 hertz (Hz), and wherein the second value is 15 Hz.

14. A computer program product comprising computer-executable instructions stored on a non-transitory computer-readable medium that, when executed by a processor, cause a terminal to:
monitor whether a low-power running condition is satisfied, wherein a display screen of the terminal comprises an organic light emitting display screen, and wherein each pixel unit of the organic light emitting display screen comprises one red subpixel, one blue subpixel, and one green subpixel;
detect that the terminal satisfies the low-power running condition, wherein satisfying the low-power running condition comprises a battery level of the terminal having less than a preset value;
decrease a frequency of a drive signal of the red subpixel, a drive signal of the green subpixel, or a drive signal of the blue subpixel to a selected first value when the terminal satisfies the low-power running condition; and
decrease a frequency of another drive signal other than a drive signal whose frequency is decreased to the first value to a second value, wherein the second value is greater than the first value.

15. The computer program product of claim 14, wherein the computer-executable instructions stored on the non-transitory computer-readable medium, when executed by a processor, cause the terminal to decrease a frequency of two of: the drive signal of the red subpixel, the drive signal of the green subpixel, or the drive signal of the blue subpixel, when the terminal satisfies the low-power running condition.

16. The computer program product of claim 14, wherein the computer-executable instructions stored on the non-transitory computer-readable medium, when executed by a processor, cause the terminal to detect that the terminal satisfies the low-power running condition comprises when the terminal is in a low power mode.

17. The computer program product of claim 14, wherein the computer-executable instructions stored on the non-transitory computer-readable medium, when executed by a processor, cause the terminal to determine detect that the terminal satisfies the low-power running condition upon receiving a preset instruction.

18. The computer program product of claim 14, wherein the computer-executable instructions stored on the non-transitory computer-readable medium, when executed by a processor, cause the terminal to activate an OLED display screen.

19. The computer program product of claim 18, wherein the terminal comprises an active-matrix OLED (AMOLED) display screen.

20. The computer program product of claim 14, wherein the computer-executable instructions stored on the non-transitory computer-readable medium, when executed by a processor, cause the terminal to decrease the first drive signal value to 1 hertz (Hz), and to decrease the second drive signal value to 15 Hz.

\* \* \* \* \*